US008363706B2

(12) United States Patent
Schoppmeier

(10) Patent No.: US 8,363,706 B2
(45) Date of Patent: Jan. 29, 2013

(54) COMMUNICATION METHODS AND APPARATUSES

(75) Inventor: Dietmar Schoppmeier, Neubiberg (DE)

(73) Assignee: Infineon Technologies AG, Neubiberg (DE)

( * ) Notice: Subject to any disclaimer, the term of this patent is extended or adjusted under 35 U.S.C. 154(b) by 1169 days.

(21) Appl. No.: 11/746,937

(22) Filed: May 10, 2007

(65) Prior Publication Data
US 2008/0279265 A1  Nov. 13, 2008

(51) Int. Cl.
*H04B 1/38* (2006.01)
*H04L 5/16* (2006.01)

(52) U.S. Cl. .................. 375/222; 714/716; 714/755

(58) Field of Classification Search ............. 375/222, 375/260; 714/716, 755
See application file for complete search history.

(56) References Cited

U.S. PATENT DOCUMENTS

| 6,408,004 | B1 | 6/2002 | Wetzel et al. | |
|---|---|---|---|---|
| 6,704,351 | B1 | 3/2004 | Ott et al. | |
| 6,922,444 | B1* | 7/2005 | Cai et al. | 375/260 |
| 7,187,712 | B2 | 3/2007 | Chow et al. | |
| 7,317,754 | B1* | 1/2008 | Remy et al. | 375/222 |
| 2004/0081233 | A1 | 4/2004 | Bremer et al. | |
| 2006/0080586 | A1* | 4/2006 | Starr | 714/746 |
| 2006/0150059 | A1 | 7/2006 | Modlin | |
| 2006/0274840 | A1 | 12/2006 | Tzannes | |
| 2007/0064604 | A1 | 3/2007 | Chen et al. | |
| 2007/0077953 | A1* | 4/2007 | Wang | 455/517 |
| 2007/0127584 | A1* | 6/2007 | Tzannes | 375/260 |

FOREIGN PATENT DOCUMENTS

| EP | 1 555 773 A2 | 7/2005 |
|---|---|---|
| WO | WO 2005 057 315 | 6/2005 |

OTHER PUBLICATIONS

"Physical layer management for digital subscriber line (DSL) transceivers," Series G: Transmission Systems and Media, Digital Systems and Networks, International Telecommunication Union, G.997.1, Jun. 2006, 102 pages.

"Asymmetric digital subscriber line transceivers 2 (ADSL2)," Series G: Transmission Systems and Media, Digital Systems and Networks, International Telecommunication Union, G.992.3, Jan. 2005, 435 pages.

* cited by examiner

*Primary Examiner* — Curtis Odom
(74) *Attorney, Agent, or Firm* — Slater & Matsil, L.L.P.

(57) ABSTRACT

A system and method for communication provides an adaptation value for at least one communication parameter, the adaptation value describes a variation of the communication parameter to be enabled during that data communication. The communication parameter is determined such that the variation indicated by the adaptation value is possible during data communication without violating a limit for the communication parameter.

33 Claims, 3 Drawing Sheets

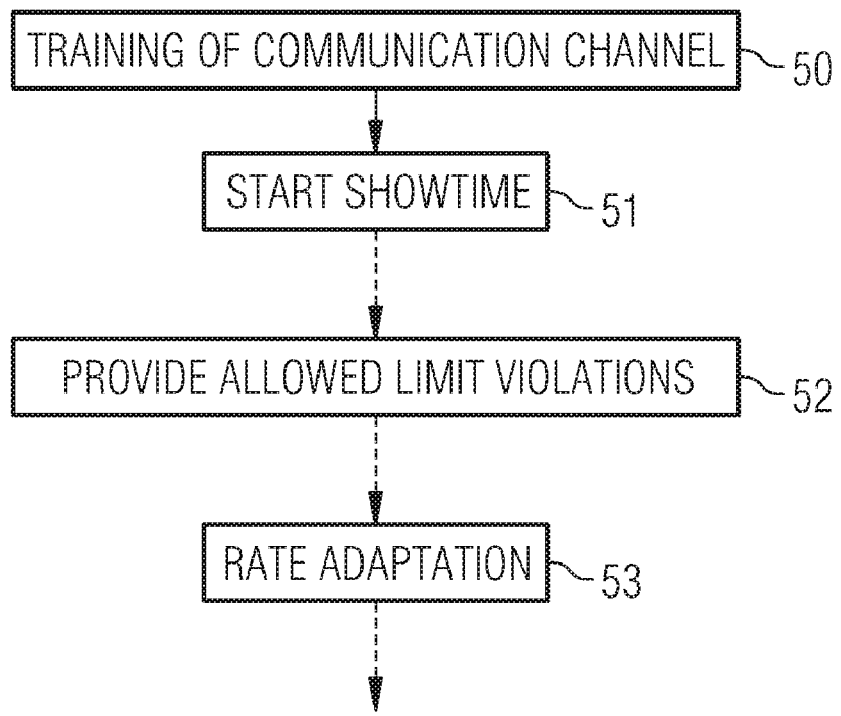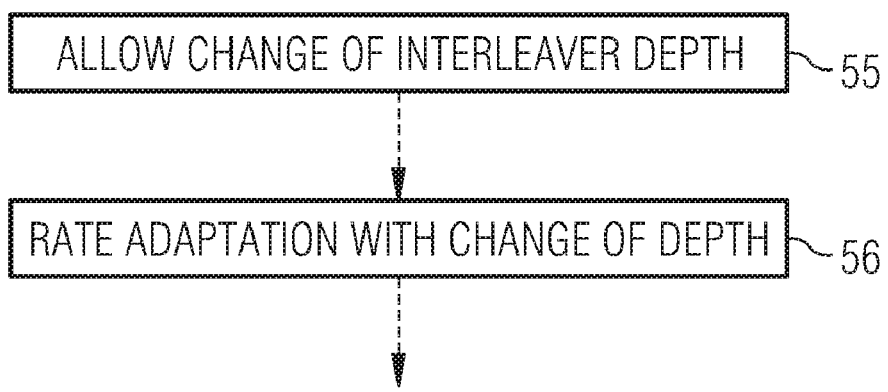

COMMUNICATION METHODS AND APPARATUSES

BACKGROUND

This invention relates to communication methods and apparatuses.

BRIEF DESCRIPTION OF THE DRAWINGS

In the following, exemplary embodiments will be described with reference to the attached drawings, which are to be taken as illustrative examples only and not to be construed as limitative.

FIG. 5 is a flow diagram of a method according to another embodiment; and

FIG. 6 is a flow diagram of a method according to yet another embodiment.

DETAILED DESCRIPTION OF ILLUSTRATIVE EMBODIMENTS

Figure 1:
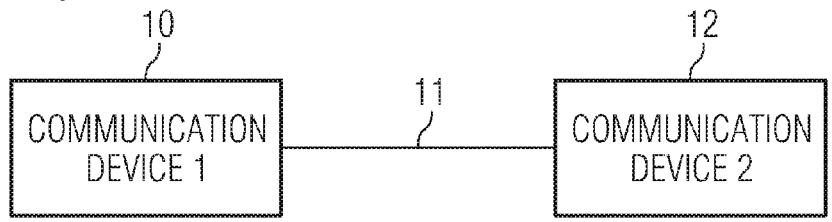
FIG. 1 is a schematic diagram of an embodiment of a communication system.

In the following, exemplary embodiments of the present invention will be described in detail. It is to be understood that the following description is given only for the purpose of illustrating the invention and is not to be taken in a limiting sense. In particular, the scope of the invention is not intended to be limited by the exemplary embodiments described hereinafter.

It is also to be understood that, in the following description of exemplary embodiments, any direct connection or coupling between functional blocks, devices, components or other physical or functional units shown in the drawings or described herein could also be implemented by an indirect connection or coupling. While some of the exemplary embodiments will be described in the context of digital subscriber line (DSL) technology below, it is to be understood that the various embodiments are not limited thereto. Rather, the methods and apparatuses described below may be applied in other communication devices and methods, for example, in wireless communication.

It should be understood that the features of the various exemplary embodiments described herein may be combined with each other unless specifically noted otherwise.

In FIG. 1, a communication system according to an embodiment is shown. In the embodiment of FIG. 1, a first communication device 10 communicates via a communication channel 11 with a second communication device 12. The communication via communication channel 11 may be a bidirectional communication, such that first communication device 10 and second communication device 12 both act as transceivers, or as a unidirectional connection, for example such that the first communication device 10 acts as transmitter and second communication device 12 acts as receiver.

In the communication system according to the embodiment of FIG. 1, at the start up of communication in a so called training phase communication parameters are determined, among them a data rate of the communication. In particular embodiments, this data rate is determined based on properties of communication channel 11 like noise. In this respect, communication channel 11 may be a wire based communication channel or a wireless communication channel and may comprise a plurality of subchannels, for example, using different frequency ranges.

Further communication parameters depend on the type of communication used, for example, DSL communication, wireless communication etc. In embodiments of the invention, limits are given for these communication parameters.

When, for example, during communication the properties of communication channel 11 like noise change, it may be possible to increase the data rate (for example, when noise decreases) or it may be necessary to decrease the data rate (for example, when noise increases). In embodiments, such a change of data rate is performed without interrupting communication, i.e., a so-called seamless rate adaptation (SRA) is performed. Changing the data rate often implies change of other communication parameters, which may be limited by the above-mentioned limits. Therefore, the limits in embodiments may put constraints on the change of the data rate.

Further below, methods which may, for example, be implemented in the communication system of the embodiment of FIG. 1 will be discussed for performing the rate adaptation while taking the communication parameters including their limits into account.

Figure 2:
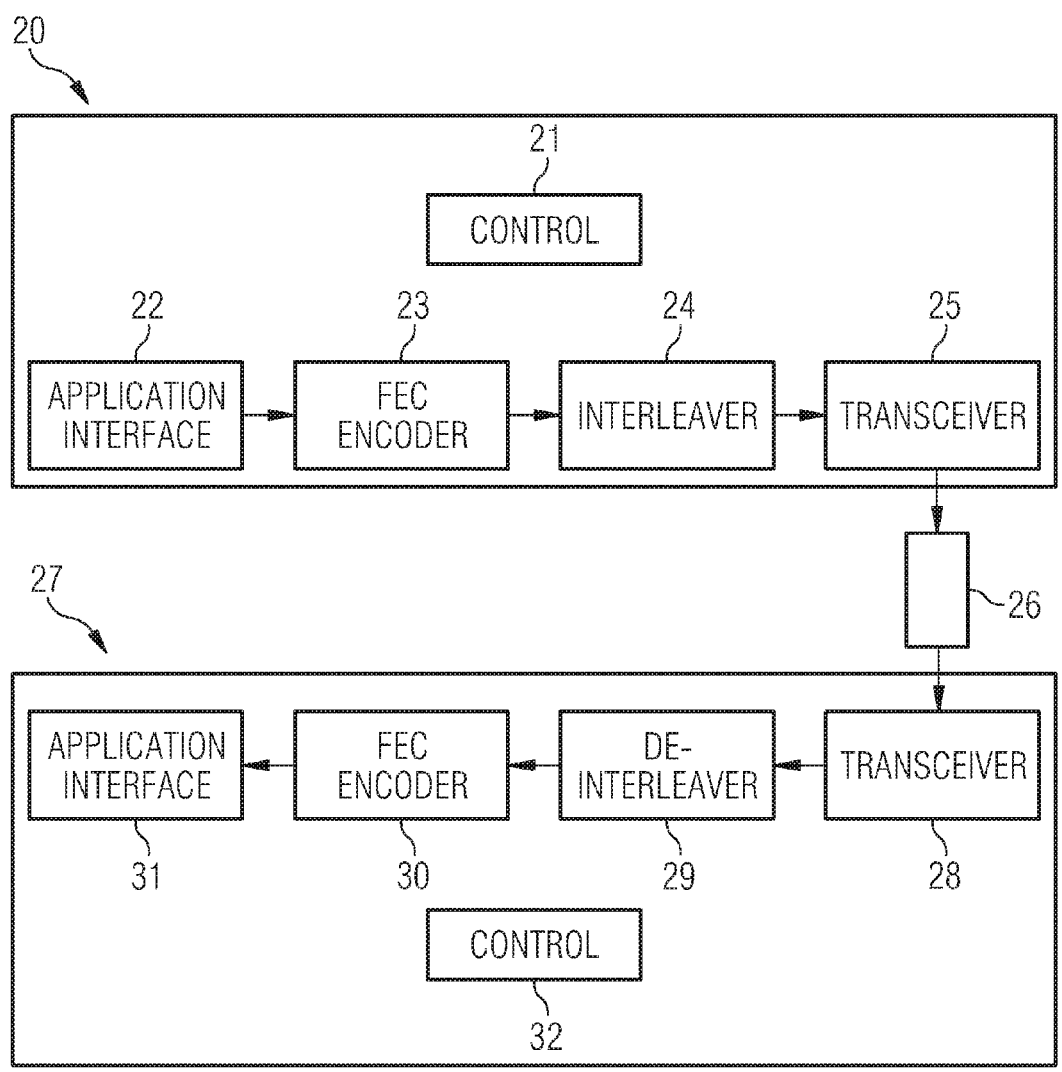
FIG. 2 is a block diagram of a further embodiment of a communication system.

In order to give a more concrete example for a communication system and the associated communication parameters, with reference to FIG. 2 a DSL communication system according to an embodiment is shown.

The DSL communication system shown in FIG. 2 according to an embodiment comprises a first DSL modem 20 and a second DSL modem 27. In order to simplify the drawing, first DSL modem 20 is shown as transmitting data and second DSL modem 27 is shown as receiving data in FIG. 2. However, it is to be understood that second DSL modem 27 may also act as transmitter and first DSL modem 20 may also act as receiver.

In an embodiment, first DSL modem 20 is located in a central office (CO), for example, of an internet service provider, and second DSL modem 27 is located in customers' premises, for example, a private home.

It should be noted that the elements of first DSL modem 20 and second DSL modem 27 are not to be construed to be a complete representation of all the elements in a DSL modem, and other elements may additionally or alternatively be present.

First DSL modem 20 comprises an application interface 22 for receiving data, for example, from a computer, another communication system like a backbone network and the like. Besides payload data, i.e., data to be transmitted to second DSL modem 27, application interface 22 also serves for receiving command data for controlling first DSL modem 20.

At least the payload data is then forwarded to a forward error correction encoder 23 which performs an encoding to provide forward error correction (FEC). Such encoding may, for example, comprise a Reed-Solomon encoding. Generally, such an encoding for forward error correction adds some redundancy to the data such that if parts of the data are destroyed during transmission, they can be reconstructed.

The encoded data is then forwarded to an interleaver 24 which performs an interleaving. Interleaving generally "spreads" consecutive parts of data to be sent over a longer period of time and interleaves it with other parts of the data to be sent. Therefore if, for example, a short impulse destroys some part of the data, the probability that it destroys a large part of consecutive data is reduced which in turn enhances the probability that the destroyed data can be reconstructed by forward error correction. Interleaver 24 forwards the interleaved data to a transceiver 25, which in the situation shown in FIG. 2 acts as transmitter. In the embodiments, transceiver 25 modulates the interleaved data by using discrete multitone modulation (DMT) onto a plurality of carriers (frequency bands). Data is then sent in the form of ATM cells (asynchronous transfer mode) via communication channel 26. In other embodiments other types of modulation may be used.

First DSL modem 20 further comprises a control circuit or unit 21 which communicates with application interface 22, FEC encoder 23, interleaver 24 and transceiver 25. It should be noted that in a different embodiment instead of providing an internal control unit 21 in first DSL modem 20, also an external control (for example, implemented in a computer system) which controls first DSL modem 20 via application interface 22 may be alternatively or additionally provided.

Second DSL modem 27 comprises elements for performing the reverse steps of elements 22-25 of first DSL modem 20. In particular, second DSL modem 27 comprises a transceiver 28 which in the situation of FIG. 2 acts as receiver receiving the data transmitted by transceiver 25 via communication channel 26. Transceiver 28 performs the corresponding demodulation of the DMT modulated data and forwards the demodulated data to a de-interleaver 29 which de-interleaves the data, i.e., reverses the interleaving performed by interleaver 24. The de-interleaved data is forwarded to an FEC decoder 30 which performs a forward error correction, i.e., uses the encoding by FEC encoder 23 to correct errors which possibly had occurred during transmission. The decoded data is forwarded to an application interface 31 which serves for connecting second DSL modem 27 with outside devices, for example computer, further networks and the like, and output the data.

Second DSL modem 27 furthermore comprises a control circuit or unit 32 for communicating with application interface 31, FEC decoder 30, de-interleaver 29 and transceiver 28.

Control unit 21 and control unit 32 also control a so called handshake which designates a period when a communication is set up or trained. During this handshake, in the embodiment of FIG. 2 communication parameters as already mentioned with respect to FIG. 1 are determined. Such communication parameters include parameters of the DMT modulation, for example, a number of bits per symbol which in turn influences the data rate, the so-called depth of interleaver 24 and de-interleaver 29 which determines over which period of time consecutive data is spread and which also influences a delay caused by interleaver 24 and de-interleaver 29, an amount of redundancy used in FEC encoder 23 and the like.

It should be noted that in the embodiments of FIG. 2 only a single communication path is shown. In other embodiments, a plurality of parallel communication paths having different latencies may be provided. For example, since as mentioned above an interleaver causes delay, a communication path without interleaver having a lower latency and a communication path having an interleaver and thus having a higher latency but also a higher robustness against impulses disturbing the data communication may be provided. As already mentioned, furthermore limits for the mentioned communication parameters may be provided, wherein the limits may be, for example, fixed by a communication standard used (for example, ADSL, ADSL 2, ADSL 2+, VDSL etc.) or may be set by an operator, for example via application interface 22 and 31.

The following examples for such parameters in the ADSL 2 standard according to ITU-T G.992.3 will be given. However, this is intended to be only an example for the application of embodiments of the present invention, and similar parameters are used in embodiments using other communication standards.

In ADSL 2, so called base framing parameters are Bp, Mp, Rp, Tp, Dp, Lp, MSGc, SEQp. p in these parameters is an index specifying the latency path to which the parameter applies in case a plurality of latency paths are used as explained above. Lp defines the number of bits per DMT symbol. This parameter is, for example, varied when the data rate is changed using seamless rate adaptation (SRA) or dynamic rate repartitioning (DRR). Dp defines the interleaving depth, for example, the depth of interleaver 24 in FIG. 2. Rp defines the number of Reed-Solomon redundancy octets per FEC data frame, wherein an FEC data frame comprises the data over which FEC encoding is performed, for example, in FEC encoder 23 of FIG. 2. Tp is a ratio of a number of MUX data frames to the number of synchronization octets. A synchronization octet in other words is inserted with every Tp-th MUX data frame.

Mp defines the number of MUX data frames in an FEC data frame. Bp gives the nominal number of octets per MUX data frame. In case a plurality of so called frame bearers are assigned to the respective latency path p, Bp is actually Bp,n and gives the nominal number of octets from frame bearer n per MUX data frame. MSGc gives the number of octets in a message based portion of a so-called overhead structure, the overhead structure or overhead bytes generally relating to bytes or data which are not payload data but which are used for managing the communication. Finally, SEQp relates to the length of the synchronization octet sequence.

In case a single latency path is used, so called service parameters may be calculated based on the above base framing parameters as follows:

The net data rate NDR in bits per second available for ATM cell traffic is given by:

$$NDR = 4000 \cdot Lp \cdot Mp \cdot (Bp + (Tp-1)/Tp)/(Mp \cdot (Bp+1) + Rp) \quad (1)$$

The impulse noise protection INP in number of symbols, basically the number of consecutive symbols which may be reconstructed if destroyed by using the above mentioned forward error correction and interleaving techniques, is given by:

$$INP = 4 \cdot Rp \cdot Dp/Lp \quad (2)$$

The delay in milliseconds DELAY is given by:

$$DELAY = 2 \cdot (Mp \cdot (Bp+1) + Rp) \cdot Dp/Lp \quad (3)$$

The bit rate OR of the overhead channel, i.e. the logic channel used for transmitting the above-mentioned overhead, is given by:

$$OR = 4000 \cdot Lp \cdot Mp/(Tp \cdot (Mp \cdot (Bp+1) + Rp)) \quad (4)$$

The corresponding message base portion overhead channel rate MSG is given by:

$$MSG = OR \cdot MSGc/SEQp \quad (5)$$

A corresponding overhead channel period PER in milliseconds is given by:

$$PER = 2 \cdot SEQ \cdot Tp \cdot (Mp \cdot (Bp+1) + Rp)/(Mp \cdot Lp) \quad (6)$$

Finally, a number of symbols per FEC frame is given by:

$$S = 8 \cdot (Mp \cdot (Bp+1) \cdot Rp)/Lp \quad (7)$$

such that a FEC frame comprises (Mp·(Bp+1)+Rp) bytes.

As can be seen, all of these parameters depend on Lp, and therefore, change when Lp is changed in a rate adaptation process like seamless rate adaptation as defined in ADSL2 or ADSL 2+.

As already mentioned, limits may be given for the communication parameters. As defined in the standards for ADSL like the already mentioned G.992.3 and also in ITU-T G.997.1, these limits are given for the service parameters as defined by equations (1)-(7). Since the service parameters depend on the base frame parameters as defined above, this also puts constraints on the base frame parameters. In different embodiments it is also possible to give limits for the base frame parameters or any other communication parameters.

As already mentioned in general with reference to FIG. 1, these limits may be configurable by an operator or be fixed according to the standard. In case of ADSL, a minimal net data rate MinNDR, a maximum net data rate MaxNDR, a minimal impulse noise protection MinINP, a maximum delay MaxDELAY, a minimal message based portion overhead channel data rate MinMSG and additionally a minimum reserved data rate net_reserve which is a minimum data rate which shall always be available upon request for a reconfiguration procedure may be defined by the user as specified in G.997.1.

On the other hand, according to G.992.3 a minimum number of symbols per FEC frame MinS, a corresponding maximum number MaxS, a minimal overhead channel rate MinOR, a corresponding maximum rate MaxOR, a minimum overhead channel period MinPER and a corresponding maximum period MaxPER is defined in the standard.

The operator configurable limits are, for example, set by an internet provider and then communicated during handshake to the corresponding equipment in customers' premises.

In an embodiment, during the handshake the communication is set up such that the net data rate NDR is maximized. When the net data rate is maximized, this may lead to other parameters being near their limits, for example, MSG being only slightly above MinMSG, INP being only slightly above MinINP or delay being only slightly below MaxDELAY. If, during operation (so called showtime) the properties, for example, noise properties, of the communication channel change, as already mentioned it might be desirable or necessary to change the data rate using, for example, the already mentioned seamless rate adaptation, i.e., rate adaptation without interrupting the communication as, for example, defined in various DSL standards, or so called dynamic rate repartitioning where data rate is "swapped" between two channels. In this case, the possibilities of rate adaptation may be limited by the fact that some parameters like the above-mentioned MSG, INP or DELAY are already near their limits and would violate these limits when the data rate is changed. In the following, with respect to FIGS. 3-6 embodiments will be described adapted to such a situation. As will be explained later in greater detail, these embodiments may be used in combination or independently from each other. In an embodiment, the methods as described with reference to FIGS. 3-6 are implemented in control units 21 and 32 of FIG. 2.

In the following, MRAF will designate a maximum rate adaptation factor, i.e., the ratio between the maximum data rate and the minimum data rate. This maximum rate adaptation factor corresponds to a maximum upshift margin factor MUMF for the data rate if the data rate, for example, the data rate of beginning of showtime, corresponds to MinNDR. In other words, through rate adaptation this data rate may be increased up to MUMF·MinNDR. On the other hand, MRAF corresponds to a maximum downshift margin factor MDMF for the data rate if the data rate corresponds to MaxNDR, for example, at the beginning of showtime, such that the data rate may be decreased to MaxNDR/MDMF.

Figure 3:
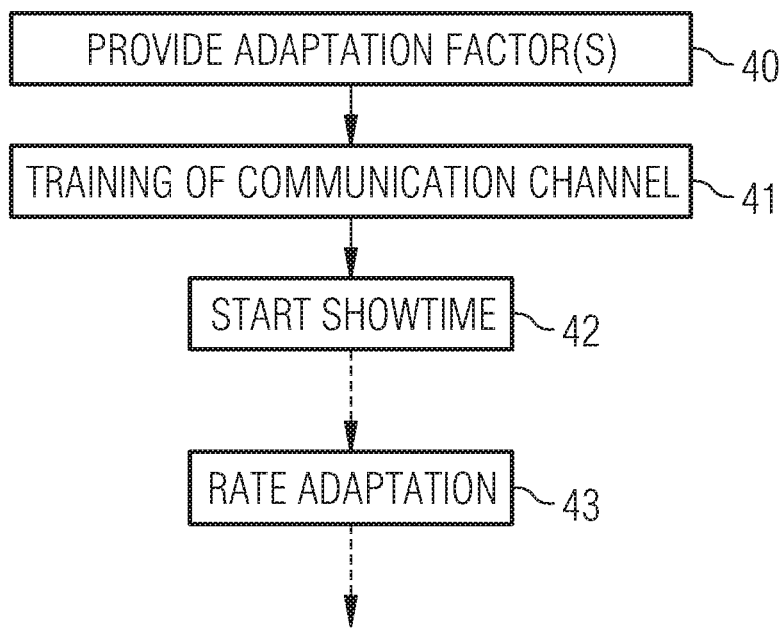
FIG. 3 is a flow diagram of a method according to an embodiment.

Turning now to FIG. 3, an embodiment for communication via a communication channel is shown which, for example, may be implemented in the embodiment of FIG. 1 or FIG. 2. In step 40, one or more adaptation factors for communication parameters are provided. In other words, in step 40 it is provided by which factors communication parameters are to be able to change without violating their limits during communication, e.g., when a rate adaptation is performed. In an embodiment, a single factor, for example, the above-mentioned MRAF, is provided and valid for all parameters. In another embodiment, a single factor is provided, but only valid for selected parameters. In still another embodiment, individual factors are attributed to different parameters, including a factor of one which corresponds to no range for the respective parameter. It should be noted that the latter case is a general case, and if all these factors are equal, the case where a single factor is given results, and if this single factor is set to MRAF, a case where a fixed factor is given for all parameters results. In another embodiment, a single user configurable factor is given for all the parameters, or separate parameters for upshift and downshift are given. For example, in such embodiments MUMF and MDMF, i.e., the maximum upshift margin factor and the maximum downshift margin factor, may be configurable from 1 to MRAF, for each communication parameter separately or globally for all communication parameters.

In embodiments where configurable factors or margins are given for the various parameters separately, in the example of ADSL given above, for example, maximum upshift margin factors may be given for MinINP, MinS, MaxOR, and maximum downshift margin factors may be given by MaxDELAY, MaxS and MinMSG, wherein each factor in this embodiment is chosen to be between one and MRAF. The respective factors will be designated MUMF_MinINP, MUMF_MinS, MUMF_MaxOR, MDMF_MaxDELAY; MDMF_MaxS and MDMF_MinMSG, respectively. As a matter of course, the same principle may be applied to other communication parameters.

The at least one adaptation factor of step 40 may be fixedly stored in a memory of the communication system and/or provided by a user and may be communicated from one communication device to another communication device, for example, from first communication device 10 to second communication device 12 of FIG. 1 or from first modem 20 to second modem 27 in FIG. 2. This communication corresponds to the communication of a so-called service policy.

In step 41, a training of the communication channel is performed, which includes determining the relevant communication parameters as exemplary described above. During this training, the at least one adaptation factor provided in step 40 is taken into account. In other words while, for example, the net date rate NDR is maximized as far as possible within the limits for this net data rate, the remaining communication parameters are determined such that they may be changed by the at least one adaptation factors later on without violating their limits.

In step 42, the so-called showtime, i.e., the transmission of the actual payload data, is started. As indicated by dashed arrows, at some point during showtime in step 43 a rate adaptation may be performed, wherein since the adaptation factors provided in step 40 were taken into account during the training of the communication channel, the rate adaptation with the associated change of diverse communication parameters is possible without violating the limits of the communication parameters.

Figure 4:
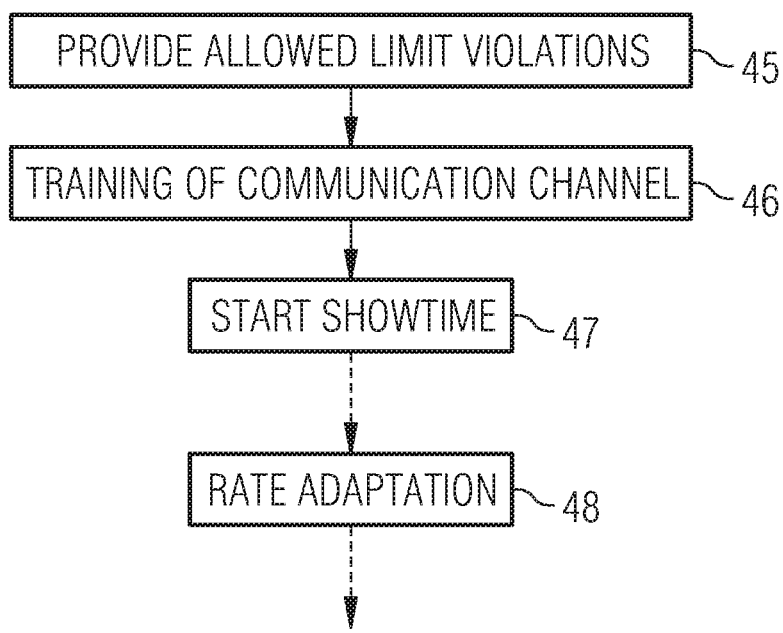
FIG. 4 is a flow diagram of a method according to a further embodiment.

In FIG. 4, a different embodiment is shown. In the embodiment of FIG. 4, in step 45 allowed limit violations for communication parameters are provided. In other words, in step 45 it is determined which communication parameters may violate their respective limits during showtime and possibly by how much they may violate their limits. This may, for example, be done by providing additional limits which are valid during showtime and which are below the minimal values of the above-discussed limits or above the maximum values of the already above-discussed limits. For example, for INP a minimum value MinINPshowtime, for DELAY a new value MaxDELAYshowtime, values MinMSGshowtime, MinSshowtime, MaxSshowtime, MaxORshowtime and the like may be provided. Instead of providing such new limits valid during showtime, also an allowed limit variation relative to the previously discussed limits like MinINP, MinS etc. may be provided.

In this embodiment, separate limit violations may be provided for each parameter. In an embodiment, the limit violations may include a "special value" indicating that any limit violation is allowed, i.e., during showtime no limit exists anymore.

It should be noted that, for example, by setting the showtime limit provided in step 45 to the original value (for example, by setting MinINPshowtime to MinINP), no limit violation may be allowed for certain parameters. Therefore, in an embodiment, limit violations, either predetermined limit violations or any limit violations, may be allowed only for some of the parameters. In another embodiment, any limit violation is allowed for any parameter.

In step 46, the training of the communication channel is performed which in this embodiment is similar to conventional training where only the original limits are known. In step 47, showtime is started. At some time during showtime, a rate adaptation is performed in step 48. During the rate adaptation, limits of communication parameters may be violated as allowed in step 45.

Similar to the embodiment of FIG. 3, provision of the allowed limit variations may be seen as communicating a new service policy. Like the adaptation factors of the embodiment of FIG. 3, the limit violations may be fixedly stored in a memory, configured by an operator, or both. The limit violations may be communicated from one communication device to another communication device.

In the embodiment of FIG. 4, the allowed limit violations are not taken into account during the training of the communication channel of step 46, but only used during the rate adaptation of step 48. Therefore, step 45 needs not to be performed prior to the training of the communication channel, but may be performed any time before the rate adaptation. This is shown in an exemplary manner in the embodiment of FIG. 5 which is a modification of the embodiment of FIG. 4.

In embodiment of FIG. 5, in step 50 the training of the communication channel is performed as in step 46 of FIG. 4, and in step 51 showtime is started as in step 47 of FIG. 4. Sometime during showtime, allowed limit violations are provided in step 52 which, apart from its position during showtime, corresponds to step 45 of FIG. 4. In step 53, a rate adaptation similar to step 48 of FIG. 4 is performed where communication parameters may be changed and violate their limits according to the allowed limit violations communicated in step 52.

It should be noted that the step of providing the allowed limit violations may, in other embodiments, also be performed more than once. For example, allowed limit violations may be provided at start up of the communication system like in step 45 in FIG. 4, and later during showtime the allowed limit violations may be changed one or more times as in step 52 of FIG. 5.

In case of the embodiment of FIG. 5 where the allowed limit violations are provided in showtime, an overhead channel may be used for communicating the allowed limit violations via a corresponding message in the overhead channel.

In FIG. 6, a further embodiment of a method for data communication is shown. A step 55 of this method may, similar to steps 45 and 52 of FIGS. 4 and 5, respectively, be performed either before or after the start of showtime. In step 55, a change of depth of an interleaver is allowed. In the above example of ADSL communication, this corresponds to allowing a change of the parameter Dp. Step 55 again corresponds to communicating a new service policy.

When later during showtime a rate adaptation is performed, the interleaver depth is also changed. In DSL communication systems, as already mentioned the rate adaptation basically is performed by changing the number of bits per symbol, i.e., parameter Lp. In an embodiment, the interleaver depth is changed such that the ratio Dp/Lp is approximately kept constant, for example, kept constant within ±10%. In the example of ADSL, the parameters INP and DELAY depend on this ratio Dp/Lp. Therefore, when performing rate adaptation with corresponding change of interleaver depth in step 56, also the parameters INP and DELAY are approximately kept constant, which reduces the risk of violations of limits for these parameters.

As already mentioned, the embodiments of FIGS. 3-6 may be combined in various ways. For example, when the embodiment of FIG. 6 is combined with the embodiment of FIG. 3 or the embodiment of FIG. 4, no or only small adaptation factors or limit violations need to be provided for communication parameters which are approximately kept constant by changing the interleaver depth when performing the rate adaptation, like INP and DELAY in case of ADSL communication.

When combining the embodiments of FIG. 3 with the embodiment of FIG. 4 or FIG. 5, for some parameters adaptation factors may be provided, while for other parameters limit violations may be allowed. In an embodiment, for example, no limit violations are allowed for limits which must not be violated for technical reasons. For example, in ADSL 2+ systems MinS is ⅓ and must not be violated to prevent a so-called "transmitter stuck." For such parameters the limits of which must not be violated for technical reasons adaptation factors in an embodiment may be provided.

It should be noted that for bidirectional communication, the above embodiments may be employed separately for the two communication directions, e.g., upstream direction and downstream direction. In other words, different adaptation factors and/or allowed limit violations may be provided for the two different communication directions, and/or a change of interleaver depth as in the embodiment of FIG. 6 may be allowed for only one direction, for both directions or for no direction.

Next, some configuration examples will be given using ADSL as an example. However, it should be noted that, as already mentioned, similar communication parameters also exist for other communication standards, for example, other DSL standards or wireless standards, and the embodiments of FIGS. 3-6 may be applied to such different standards as well.

For example, in an embodiment of an ADSL system like the one shown in FIG. 2 a combination of the embodiment of FIG. 3 with the embodiment of FIGS. 4 and/or 5 is used.

In this case, in an embodiment a violation of the upper limits for the overhead channel rate OR and the number of symbols per FEC frame, MaxOR and MaxS, is allowed.

Therefore, it is communicated that these limits may be violated. For MinS in this embodiment no limit violation is allowed, and an adaptation factor like in step 40 of FIG. 3 is provided which in this case (since MinS is a lower limit) is a maximum upshift margin factor. In an embodiment, this factor MUMF_MinS is set to MaxNDR/MinNDR, i.e., to MRAF. In a different embodiment, if a corresponding factor for MinINP is smaller than this value, MUMF_MinS is set to MUMF_MinINP.

In this embodiment, if MinINP is equal to zero this limit does not have to be taken into account since INP is always equal or greater than zero. If, on the hand, MinINP is greater than zero, in an embodiment MUMF_MinINP is set to (1+MRAF)/2. It should be noted that a greater value of MUMF_MinINP provides a greater margin for a later rate adaptation, but makes it more difficult to reach showtime, i.e., to find during training a configuration which fulfils the requirement. On the other hand, a lower value for MinINP gives a smaller margin for rate adaptation and therefore if, for example, noise the possible performance increase is smaller.

In an embodiment, MinMSG is set to 4000 and MDMF_MinMSG to MaxNDR/MinNDR such that regarding this limit also the full range is possible.

If no interleaving is present (which in ADSL is signaled by MaxDELAY=1) MaxDELAY may be violated by rate adaptations in an embodiment since in this case a rate reduction only increases transmission delay which is acceptable. If MaxDELAY>1, interleaving is present. In this case, according to an embodiment a violation of MaxDELAY is acceptable. According to a different embodiment, an adaptation factor MDMF_MaxDELAY=MaxNDR/MinNDR is chosen.

It should be noted that these numerical values serve only as examples, and other values may be chosen in other embodiments.

In another embodiment, additionally to the embodiments of FIGS. 3 and 4 or 5 the embodiment of FIG. 6 is used, i.e., a change of interleaver depth is allowed. In this case, in an embodiment the same values as given above are used with the exception of MinINP and MaxDELAY. As already explained, by changing the interleaver depth when the data rate is adapted, INP and DELAY stay approximately constant. Some changes of these values may, for example, be caused by a granularity of Dp or, in other words, the possible interleaver depths provided by the interleaver used. In an embodiment, in this case an adaptation factor slightly larger than 1 is provided for MinINP and MaxDELAY, for example MUMF_MinINP=1.1 and MDMF_MaxDELAY=1.1.

Returning to the embodiment of FIG. 3, as already explained the at least one adaptation factor provided in step 40 is taken into account during the training of the communication channel in step 41. In an embodiment, this is performed by using limits during the training which correspond to the actual limits multiplied by the respective adaptation factor. For example, if for MinINP a MUMF of 1.5 is provided and the limit is MinINP=2, the training is performed with MinINP=1.5·2=3.

In other embodiments dependencies between the parameters are taken into account. Using again ADSL as an example, as can be seen from equation (2) INP decreases with increasing Lp. If, during training, as NDR the maximum net data rate MaxNDR is achieved, during later rate adaptation the data rate will only be reduced or, in other words, Lp will be lowered increasing INP. In such a case, taken the above example MinINP also during training may be taken as MinINP=2 since no decrease of INP due to rate adaptations will occur.

In this respect, taking again ADSL as an example a permutation over all allowable values of the base framing parameters is performed, and those parameters are selected for communicating where NDR is maximized and all service parameters are within their limits. In an embodiment, this is performed by first checking for the permutation with the largest NDR (as long as it is below MaxNDR) whether the service parameters are within their limits, then for the next highest NDR, etc., until a configuration is found where all the service parameters are within their limits.

In an embodiment where adaptation factors are given for MinINP, MinS, MaxOR, MinMSG, MaxDELAY and MaxS the following checks are performed to determine whether the service parameters are within their limits taking the adaptation factors into account. In the following, ">=" means "greater or equal to" and "<=" means "smaller or equal to".

$\mu1/NDR>=MinINP$ if $NDR>=MaxNDR$ $\mu1/NDR>=MinINP*MUMF\_MinINP$ if $NDR<=MaxNDR/MUMF\_MinINP$ $\mu1/NDR>=MinINP*MaxNDR/NDR$ if $MaxNDR/MUMF\_MinINP<NDR<MaxNDR$ wherein $\mu1=4*Dp*Rp*4000\ Mp*(Bp+(Tp-1)/Tp)/(Mp*(Bp+1)+Rp)$ such that $INP=\mu1/NDR$ and $MUMF\_MinINP>1$.

In other words, if NDR>=MaxNDR, INP has to be greater or equal to MinINP, if NDR<=MaxNDR/MUMF_MinINP, INP has to be greater or equal to MinINP·MUMF_MinINP and if MaxNDR/MUMF_MinINP<NDR<MaxNDR, INP has to be greater or equal to MinINP·MaxNDR/NDR in order for the respective set of parameters to fulfil the requirements regarding INP according to this embodiment. If MUMF_MinINP=1, only the check if INP>=MinINP has to be performed, since in this case no margin for later changes is required.

$\mu2/NDR>=MinS$ if $NDR>=MaxNDR$ $\mu2/NDR>=MinS*MUMF\_MinS$ if $NDR<=MaxNDR/MUMF\_MinS$ $\mu2/NDR>=MinS*MaxNDR/NDR$ if $MaxNDR/MUMF\_MinS<NDR<MaxNDR$ wherein $\mu2=32000*Mp*(Bp+(Tp-1)/Tp)$ such that $S=\mu2/NDR$ and $MUMF\_MinS>1$ (if MUMF_MinS=1 only S>=MinS has to be checked).

$NDR/\mu3<=MaxOR$ if $NDR>=MaxNDR$ $NDR/\mu3<=MaxOR/MUMF\_MaxOR$ if $NDR<=MaxNDR/MUMF\_MaxOR$ $NDR/\mu3<=MaxOR*NDR/MaxNDR$ if $MaxNDR/MUMF\_MaxOR<NDR<MaxNDR$, wherein $\mu3=Bp*Tp+Tp-1$ such that $OR=NDR/\mu3$ and $MUMF\_MaxOR>1$ (if MUMF_MaxOR=1, only OR<=MaxOR has to be checked).

$\mu4*NDR>=MinMSG$ if $NDR<=MinNDR$ $\mu4*NDR>=MinMSG*NDR/MinBDR$ if $NDR<=MinNDR*MDMF\_MinMSG$ $\mu4*NDR>=MinMSG*MDMF\_MinMSG$ if $MinNDR*MDMF\_MinMSG*MDMF\_MinMSG<NDR<MaxNDR$ wherein $\mu4=MSGc/SEQ/(Tp*(Bp+1)-1)$ such that $MSG=\mu4*NDR$ and $MDMF\_MinMSG<1$ (if MDMF_MinMSG=1 only MSG>MinMSG has to be checked).

$\mu 5/NDR <= MaxDELAY$ if $NDR <= MinNDR$ $\mu 5/NDR <= MaxDELAY*NDR/MinNDR$ if
    $NDR <= MinNDR*MDMF\_MaxDELAY$ $\mu 5/NDR <= MaxDELAY*MDMF\_MaxDELAY$ if
    $MinNDR*MDMF\_MaxDELAY < NDR < MaxNDR$ wherein $\mu 5 = 8000*Dp*Mp*(Bp+(Tp-1)/Tp)$ such that $DELAY=\mu 5/NDR$ and $MDMF\_MaxDELAY>1$ (if $MDMF\_MaxDELAY=1$ only $DELAY<=MaxDELAY$ has to be checked).

$\mu 6/NDR <= MaxS$ if $NDR <= MinNDR$ $\mu 6/NDR <= MaxS*NDR/MinNDR$ if
    $NDR <= MinNDR*MDMF\_MaxS$ $\mu 6/NDR <= MaxS*MDMF\_MaxS$ if
    $MinNDR*MDMF\_MaxS < NDR > MaxNDR$ wherein $\mu 6 = 32000*Mp*(Bp+(Tp-1)/Tp) = \mu 2$ such that $S=\mu 6/NDR$ and $MDMF\_MaxS>1$ (if $MDMF\_MaxS=1$ only $S<=MaxS$ has to be checked).

The first checks for MinINP correspond to the above example where the actual limit for INP to be taken into account during training depends on the NDR obtained. Similar considerations hold true for the remaining parameters.

Again, it is to be noted that the above is only intended to give an exemplary implementation under ADSL, and other implementations both in ADSL and other standards are possible as well.

As already mentioned, the provision of rate adaptation factors, of allowed limit variations and/or the allowing of a change of interleaver depths of the embodiment may be seen as communicating a new service policy. In an embodiment, this service policy is communicated by using one or more parameters. These parameters may comprise a parameter already used for other purposes in a communication standard and/or may comprise a parameter introduced for communicating such a service policy. In an embodiment which again relates to ADSL, for example the service policy parameter CIPOLICY, which was introduced into the standard with G.992.3 amendment 3, may be extended. In the current standardized form through this parameters between a service policy which tries to maximize NDR and a service policy which tries to maximize INP for a maximum impulse noise protection is defined. This parameter exists for upstream and downstream direction, i.e., for the two directions of a bi-directional communication, separately.

According to an embodiment, this parameter is extended to a 6 bit parameter, wherein the most significant bit is used for signaling that an additional service policy as the ones described above for re-configuration, i.e., rate adaptation or rate repartitioning, is to be taken account and that further parameters follow describing how this is to be implemented. In other words, after this parameter in this embodiment further parameters follow which in the embodiment are all 6 bit parameters. The first 6 bit parameter which follows indicates which aspects should be implemented. For example, a value of 1 for this first parameter, which may be called reconfig_policy, indicates that the combination of the embodiment of FIG. 3 with the embodiment of FIGS. 4 and 5 is to be used, and a value of 2 indicates that additionally the embodiments of FIG. 6 should be used. Other values may indicate other aspects, for example, the use of one of the embodiments alone. Then, in an embodiment the following 6 bit parameters follow:

mumf_min_inp

MUMF_Min_S

MUMF_Max_OR

MDMF_Min_MSG

MDMF_Max_DELAY

MDMF_Max_S showtime_Min_INP showtime_Min_S showtime_Max_OR showtime_Min_MSG showtime_Max_DELAY showtime_Max_S This selection of parameters relates to the example given above where it was explained in detail for which service parameters adaptation factors are given and for which other parameters limit violation are allowed. In other embodiments, the choice for which parameters adaptation factors are provided and for which parameters limit violations are allowed may be different, and correspondingly the parameters used are different.

The MUMF/MDMF values may be coded as (MUMF(or MDMF)−1)/0.125 such that a valid range from 1-56 results with "special values" 0 and 63, wherein 0 means no margin (i.e., a factor of 1) and 63 means full margin MaxNDR/MinNDR. In this embodiment, showtime_Min_INP is coded as the corresponding limit Min_INP with a special value 63 signifying no limit and a special value 0 which means that in showtime the same value, i.e., Min_INP, is valid as during training or in other words no limit violation is allowed. These two special values 63 and 0 in the embodiment currently discussed also apply to the other parameters indicating allowed limit violations, i.e., the parameters starting with "showtime" above.

Showtime_Min_S may be coded by using the reciprocal value of the actual minimum value allowed in showtime.

Showtime_Max_OR may be coded by subtracting 64 from the maximum allowed value in Kbits/s. Showtime_Min_MSG may be coded by giving the minimum allowed value in Kbits/s.

Showtime_Max_DELAY may be coded by giving the delay in ms. Showtime_Max_S finally may be coded by dividing the maximum allowed value for S through Mp minus 32.

As a matter of course, these codings and parameters are only intended to be an example on how an embodiment of the present invention may be implemented, and any other coding and system of parameters may also be used for conveying the necessary information. For example, in other embodiments the parameters may have a number of bits other than 6.

In an embodiment, the mentioned 6 bit parameter reconfig_policy is subdivided, wherein the three least significant bits have the significance as explained above, i.e., indicate which aspects are to be used. The three most significant bits in this embodiment may be called reconfig_policiy_preselect and indicate whether further parameters like the ones given above follow or predetermined stored values should be used for these parameters. For example, if reconfig_policy_preselect=0 then parameters follow, if it is unequal 0 no parameters follow and stored values are to be used.

Also more than one set of parameters may be stored, and in this case by using reconfig_policy_preselect the set is chosen. Related to the examples given above, the following sets of parameters may be stored.

reconfig_policy_preselect=1

MUMF_Min_INP=4

MUMF_Min_S=63

MUMF_Max_OR=0

MDMF_Min_MSG=63

MDMF_Max_DELAY=0

MDMF_Max_S=0 showtime_Min_INP=0 showtime_Min_S=0 showtime_Max_OR=63 showtime_Min_MSG=0 showtime_Max_DELAY=63 showtime_Max_S=63  (9)

reconfig_policy_preselect=2

MUMF_Min_INP=4

MUMF_Min_S=63

MUMF_Max_OR=0

MDMF_Min_MSG=63

MDMF_Max_DELAY=63

MDMF_Max_S=0 showtime_Min_INP=0 showtime_Min_S=0 showtime_Max_OR=63 showtime_Min_MSG=0 showtime_Max_DELAY=0 showtime_Max_S=63  (10)

reconfig_policy_preselect=3

MUMF_Min_INP=0

MUMF_Min_S=63

MUMF_Max_OR=0

MDMF_Min_MSG=63

MDMF_Max_DELAY=0

MDMF_Max_S=0 showtime_Min_INP=0 showtime_Min_S=0 showtime_Max_OR=63 showtime_Min_MSG=0 showtime_Max_DELAY=63 showtime_Max_S=63  (11)

reconfig_policy_preselect=4

MUMF_Min_INP=0

MUMF_Min_S=63

MUMF_Max_OR=0

MDMF_Min_MSG=63

MDMF_Max_DELAY=0

MDMF_Max_S=0 showtime_Min_INP=63 showtime_Min_S=0 showtime_Max_OR=63 showtime_Min_MSG=0 showtime_Max_DELAY=63 showtime_Max_S=63  (12)

Parameter set (9), (10) and (11) are intended for a service policy using adaptation factors and limit violations, i.e., embodiments of FIGS. 3, 4 and 5, but no change of interleaver depth as in the embodiment of FIG. 6. Parameter set (12) additionally uses the embodiment of FIG. 6.

Parameter set (9) is adapted for a communication where MinINP>0 and which is not delay sensitive, i.e., where a higher delay may be tolerated. Therefore, showtime_max_delay is set to 63 meaning that this parameter may be violated. Parameter set (10) corresponds to a communication where MinINP>0 and which is delay sensitive. In this case, no limit violation is allowed for MaxDELAY, and instead an adaptation factor is provided for MaxDELAY corresponding to the full range.

Parameter set (11) relates to a situation where MinINP=0.

As already mentioned, parameter set (12) is intended to be used when a variation of the interleaver depth like in the embodiment of FIG. 6 is allowed. In this case, violations of MinINP and MaxDELAY may be accepted since these violations generally remain small as Dp/Lp approximately is held constant.

Depending on the communication situation, other predetermined parameter sets may be stored as well. Moreover, in case other communication standards than ADSL are used, corresponding other parameter sets may be stored.

The above embodiments are intended to serve illustrative purposes only. In particular, while embodiments have been explained making reference to ADSL as defined in the respective standards, in other embodiments other standards and respective communication parameters may be used. Moreover, while in the above embodiments limit violations and adaptation factors have been provided regarding service parameters which are dependent from base framing parameters according to equations (1)-(7), in other embodiments limits, adaptation factors and/or limit violation allowances may be given for base parameters directly.

Furthermore, while in the embodiments above adaptation factors are given, in other embodiments instead of a factor an adaptation value giving a range in which the respective parameter may move may be equally given. For example, instead of giving a MUMF of 1.5 for MinINP and setting a value of MinINP=2 as limit, it is also possible to state that the INP value may move between 2 and 3. In a similar manner, as already explained, the limit violations may be specified as new limits during showtime, margins by which the limits may be violated or also multipliers.

What is claimed is:

1. A method for communication comprising:
providing an adaptation value for at least one communication parameter, the adaptation value describing a quantitative amount of allowable variation of the communication parameter to be enabled during data communication, wherein the adaptation value is provided during a first phase;
determining the at least one communication parameter during a first phase; and
varying the at least one communication parameter during data communication following the first phase according to the adaptation value without violating a limit for the at least one communication parameter, wherein
the at least one communication parameter comprises a data rate,
the adaptation value comprises a ratio describing a quantitative amount of allowable variation of the communication parameter to be enabled during data communication, and
the adaptation value comprises a value less than a ratio of a maximum data rate to a minimum data rate.

2. The method according to claim 1,
wherein the at least one communication parameter comprises a plurality of communication parameters, and
wherein the providing step further comprises providing an individual adaptation value for each of the plurality of communication parameters.

3. The method according to claim 1, wherein the adaptation value comprises an adaptation factor indicating a relative variation with respect to the limit.

4. The method according to claim 1, wherein the first phase comprises a training period for the data communication.

5. The method according to claim 1, wherein the communication parameter is determined depending on a further limit value calculated based on the adaptation value and the limit.

6. The method according to claim 1, wherein the determining step further comprises:
determining if the limit can be violated during communication; and
disregarding the adaptation value if the limit cannot be violated during data communication.

7. The method according to claim 1, further comprising:
performing a data rate change during the data communication, the data rate change comprises varying the at least one communication parameter.

8. The method according to claim 7, wherein the data rate change comprises one of the group consisting of a seamless rate adaptation and a dynamic rate repartitioning.

9. The method according to claim 1, comprising:
varying a depth of an interleaver used in the data communication when performing a data rate change.

10. The method according to claim 9, wherein the depth of the interleaver is varied such that a ratio of a parameter describing a number of bits per symbol of the data communication to the depth is approximately kept constant.

11. The method according to claim 1, further comprising:
providing a limit violation parameter for at least one further communication parameter, the limit violation parameter indicating an allowed limit violation for a further limit of the at least one further communication parameter.

12. The method according to claim 1, wherein the data communication is a DSL communication.

13. The method according to claim 1, wherein the at least one communication parameter further comprises a framing parameter or a service parameter.

14. The method according to claim 1, further comprising a second parameter related to noise protection.

15. The method of claim 1, wherein the adaptation value comprises a relative variation with respect to an initial value.

16. The method of claim 1, wherein the adaptation value defines a range in which the at least one communication parameter may be varied.

17. A method for communication, comprising:
providing a limit violation parameter for at least one communication parameter of a data communication, the limit violation parameter describing whether or not a violation of a limit of the at least one communication parameter is allowed during communication;
limiting the at least one communication parameter to the limit during an initialization; and
allowing the at least one communication to violate the limit during transmission of payload data if indicated by the limit violation parameter.

18. The method according to claim 17, wherein the limit violation parameter replaces the limit during transmission of payload data.

19. The method according to claim 17, further comprising:
varying a depth of an interleaver used in the data communication when performing a data rate change.

20. The method according to claim 17, wherein the data communication is a DSL communication.

21. The method according to claim 17, wherein the at least one communication parameter comprises a plurality of communication parameters, and individual limit violation parameters are given for each communication parameter.

22. The method of claim 17, wherein the at least one communication parameter affects a data rate or is affected by a data rate.

23. The method of claim 17, wherein the limit violation parameter comprises an additional limit factor, and the method further comprises adding the limit violation parameter to the limit to form a new limit.

24. A method for data communication, comprising:
choosing a service policy comprising at least one indication chosen from the group consisting of:
an indication that at least one adaptation value is to be provided for a communication parameter of the data communication, the adaptation value describing a quantitative amount of allowable variation of the communication parameter during data communication;
an indication that at least one limit violation parameter is provided for a communication parameter of the data communication, the limit violation parameter describing whether or not a violation of a limit of the communication parameter is allowed during data communication;

an indication that a change of interleaver depth is allowed during the data communication; and communicating the service policy.

25. The method according to claim 24, wherein the service policy further comprises the at least one adaptation value and the at least one limit violation parameter.

26. The method according to claim 24, wherein the service policy further comprises an indication of a stored set of adaptation values and limit violation parameters.

27. The method according to claim 24, wherein the data communication is an ADSL communication.

28. The method of claim 24, wherein the communication parameter affects a data rate or is affected by a data rate.

29. An apparatus for communication, comprising:

a communication circuit to communicate via a communication channel according to at least one communication parameter, a control circuit coupled with the communication circuit to vary the at least one communication parameter, wherein a limit violation parameter for the at least one communication parameter indicating whether or not a violation of a limit of the at least one communication parameter is allowed during data communication, wherein the at least one communication parameter is set within the limit during initialization.

30. The apparatus according to claim 29, wherein the communication circuit comprises an interleaver, wherein the control circuit is configured to be able to perform a rate change of a data rate of the data communication, the rate change comprising varying a depth of the interleaver.

31. The apparatus according to claim 30, wherein the apparatus is a DSL communication apparatus.

32. The apparatus according to claim 29, wherein the at least one communication parameter affects a data rate or is affected by a data rate.

33. A method for communication comprising:

providing an adaptation value for at least one communication parameter, the adaptation value describing a quantitative amount of allowable variation of the communication parameter to be enabled during data communication, wherein the adaptation value is provided during a first phase;

determining the at least one communication parameter during a first phase; and varying the at least one communication parameter during data communication following the first phase according to the adaptation value without violating a limit for the at least one communication parameter, wherein the at least one communication parameter comprises a data rate, the adaptation value comprises a ratio describing a quantitative amount of allowable variation of the communication parameter to be enabled during data communication, and the adaptation value comprises a ratio of a maximum data rate to a minimum data rate.

* * * * *